United States Patent
Shen et al.

(10) Patent No.: US 12,379,924 B2
(45) Date of Patent: Aug. 5, 2025

(54) REGISTER ACCESS VIA A READ PORT

(71) Applicant: Arm Limited, Cambridge (GB)

(72) Inventors: Xiaoyang Shen, Valbonne (FR); Maria Teresa Bevivino, Nice (FR); Zichao Xie, Cambourne (GB); Shun Wan, Cambridge (GB)

(73) Assignee: Arm Limited, Cambridge (GB)

( * ) Notice: Subject to any disclaimer, the term of this patent is extended or adjusted under 35 U.S.C. 154(b) by 36 days.

(21) Appl. No.: 18/410,534

(22) Filed: Jan. 11, 2024

(65) Prior Publication Data

US 2025/0231766 A1 Jul. 17, 2025

(51) Int. Cl.
*G06F 9/30* (2018.01)
*G06F 9/38* (2018.01)

(52) U.S. Cl.
CPC ...... *G06F 9/30036* (2013.01); *G06F 9/30134* (2013.01)

(58) Field of Classification Search
None
See application file for complete search history.

(56) References Cited

U.S. PATENT DOCUMENTS

| | | | | |
|---|---|---|---|---|
| 5,968,169 | A * | 10/1999 | Pickett | G06F 9/323 712/E9.083 |
| 12,105,984 | B2 * | 10/2024 | He | G06F 3/0679 |
| 2004/0268097 | A1 * | 12/2004 | Mericas | G06F 9/3861 712/E9.071 |
| 2013/0339661 | A1 * | 12/2013 | Ould-Ahmed-Vall | G06F 9/30038 712/7 |
| 2016/0094241 | A1 | 3/2016 | Rubanovich et al. | |
| 2022/0035739 | A1 * | 2/2022 | Ballapuram | G06F 3/0679 |
| 2023/0367599 | A1 * | 11/2023 | Waterman | G06F 9/30032 |

FOREIGN PATENT DOCUMENTS

WO 2023/185294 10/2023

OTHER PUBLICATIONS

Search Report for GB Application No. 2401320.8 dated Aug. 19, 2024, 4 pages.

* cited by examiner

*Primary Examiner* — Hyun Nam
(74) *Attorney, Agent, or Firm* — NIXON & VANDERHYE P.C.

(57) ABSTRACT

Apparatuses, systems, chip-containing products, methods and computer-readable media are disclosed relating to register bank circuitry providing registers holding data values and comprising at least one read port. On receipt of a register selection vector a read address compression procedure is performed on a vector of read addresses. The register selection vector comprises element validity indicators corresponding to address elements of the vector of read addresses. The compression procedure comprises identifying selected/non-selected element positions and shifting in the vector of read addresses a set of active read addresses in a predetermined direction towards a predetermined element position to form a contiguous group in the vector of read addresses ending on one side at the predetermined element position. A read vector of data values identified by the set of active read addresses is read out from the registers via a selected read port of the at least one read port.

17 Claims, 11 Drawing Sheets

REGISTER ACCESS VIA A READ PORT

TECHNICAL FIELD

The present disclosure relates to data processing. In particular, the present disclosure relates to accessing a register bank that has registers for holding data values.

DESCRIPTION

A data processing apparatus may comprise register bank circuitry providing registers for holding data values and the registers are accessed via one or more read ports. In cases where there are multiple execution units performing data processing operations, there can be multiple simultaneous requests for access to the registers. Accordingly, in order to allow for this possibility one possible approach could be to provide the register bank circuitry with more read ports. However, it is expensive in terms of power consumption and area requirement to do this. Another possible approach is to share access to the registers via a given read port amongst multiple access requesters, but this can have burdensome timing constraints and/or a sharing policy that needs careful definition and administration in order adequately to service competing requests.

SUMMARY

In one example embodiment described herein there is an apparatus comprising:
  processing circuitry to perform data processing operations in response to a sequence of instructions; and
  register bank circuitry to provide registers for holding data values that are subject to the data processing operations and comprising at least one read port via which data values are read from the registers,
  wherein the register bank circuitry further comprises register access circuitry responsive to receipt from the processing circuitry of a register selection vector to perform a read address compression procedure on a vector of read addresses, wherein the register selection vector comprises element validity indicators corresponding to address elements of the vector of read addresses,
  wherein the read address compression procedure comprises:
  identifying selected element positions and non-selected element positions based on the element validity indicators; and
  shifting in the vector of read addresses a set of active read addresses given by the selected element positions in a predetermined direction towards a predetermined element position, such that the set of active read addresses forms a contiguous group in the vector of read addresses ending on one side at the predetermined element position,
  and wherein the register access circuitry is configured to cause a read vector of data values identified by the set of active read addresses to be read out from the registers via a selected read port of the at least one read port.

In one example embodiment described herein there is a system comprising:
  the apparatus of the above example embodiment, implemented in at least one packaged chip;
  at least one system component; and
  a board,
  wherein the at least one packaged chip and the at least one system component are assembled on the board.

In one example embodiment described herein there is a method comprising:
  performing data processing operations in response to a sequence of instructions;
  holding data values in registers that are subject to the data processing operations and comprising at least one read port via which data values are read from the registers;
  in response to receipt of a register selection vector, performing a read address compression procedure on a vector of read addresses, wherein the register selection vector comprises element validity indicators corresponding to address elements of the vector of read addresses,
  wherein the read address compression procedure comprises:
  identifying selected element positions and non-selected element positions based on the element validity indicators; and
  shifting in the vector of read addresses a set of active read addresses given by the selected element positions in a predetermined direction towards a predetermined element position, such that the set of active read addresses forms a contiguous group in the vector of read addresses ending on one side at the predetermined element position; and
  causing a read vector of data values identified by the set of active read addresses to be read out from the registers via a selected read port of the at least one read port.

In one example embodiment described herein there is a non-transitory computer-readable medium to store computer-readable code for fabrication of an apparatus comprising:
  processing circuitry to perform data processing operations in response to a sequence of instructions; and
  register bank circuitry to provide registers for holding data values that are subject to the data processing operations and comprising at least one read port via which data values are read from the registers,
  wherein the register bank circuitry further comprises register access circuitry responsive to receipt from the processing circuitry of a register selection vector to perform a read address compression procedure on a vector of read addresses, wherein the register selection vector comprises element validity indicators corresponding to address elements of the vector of read addresses,
  wherein the read address compression procedure comprises:
  identifying selected element positions and non-selected element positions based on the element validity indicators; and
  shifting in the vector of read addresses a set of active read addresses given by the selected element positions in a predetermined direction towards a predetermined element position, such that the set of active read addresses forms a contiguous group in the vector of read addresses ending on one side at the predetermined element position,
  and wherein the register access circuitry is configured to cause a read vector of data values identified by the set of active read addresses to be read out from the registers via a selected read port of the at least one read port.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Figure 1:
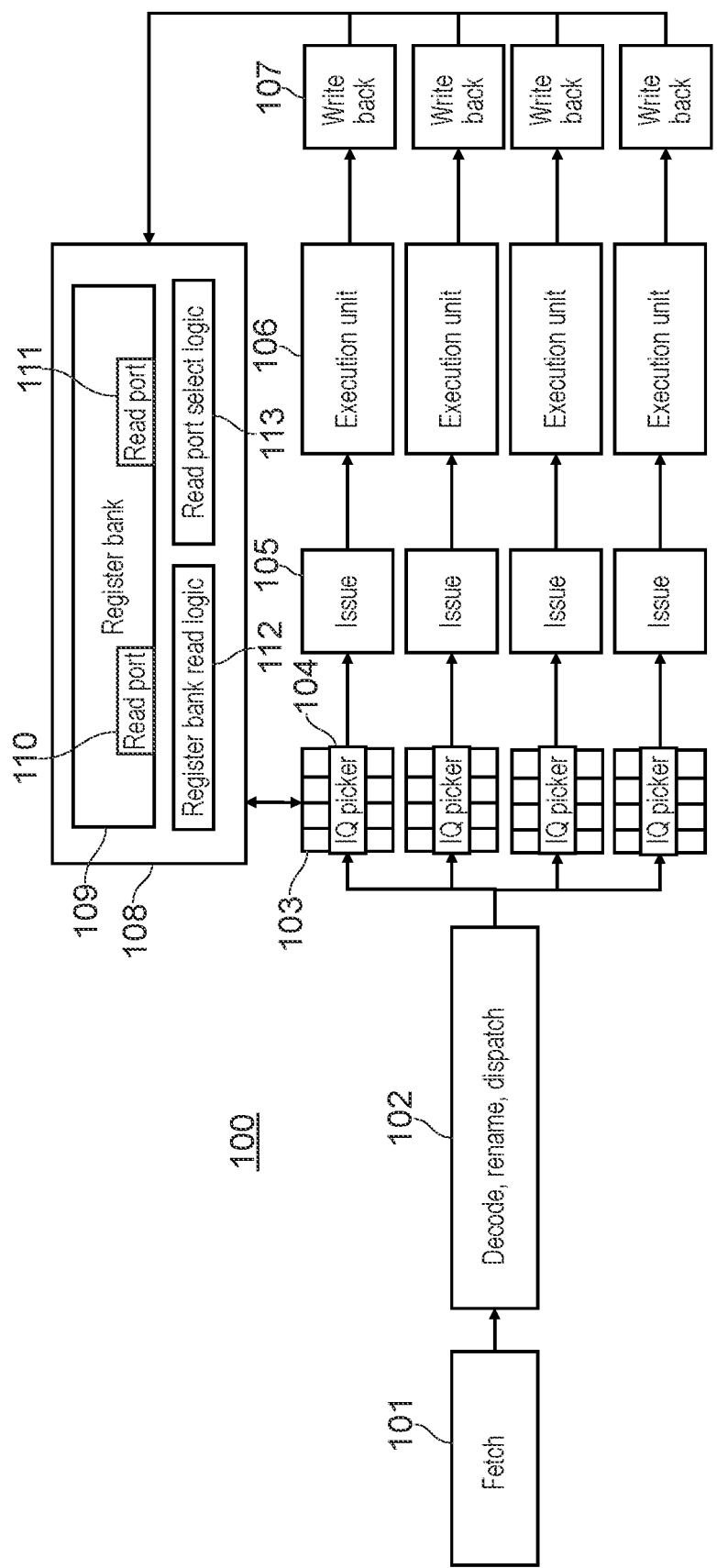
FIG. 1 schematically illustrates a data processing pipeline comprising multiple execution units for which access to registers in a register bank is required in accordance with some example embodiments.

Before discussing the embodiments with reference to the accompanying figures, the following description of embodiments is provided.

In accordance with one example configuration there is provided an apparatus comprising:

processing circuitry to perform data processing operations in response to a sequence of instructions; and register bank circuitry to provide registers for holding data values that are subject to the data processing operations and comprising at least one read port via which data values are read from the registers, wherein the register bank circuitry further comprises register access circuitry responsive to receipt from the processing circuitry of a register selection vector to perform a read address compression procedure on a vector of read addresses, wherein the register selection vector comprises element validity indicators corresponding to address elements of the vector of read addresses, wherein the read address compression procedure comprises:

identifying selected element positions and non-selected element positions based on the element validity indicators; and shifting in the vector of read addresses a set of active read addresses given by the selected element positions in a predetermined direction towards a predetermined element position, such that the set of active read addresses forms a contiguous group in the vector of read addresses ending on one side at the predetermined element position, and wherein the register access circuitry is configured to cause a read vector of data values identified by the set of active read addresses to be read out from the registers via a selected read port of the at least one read port.

The inventors of the present techniques have realised that a register selection vector received from the processing circuitry by the register bank circuitry may have a degree of sparseness that can be made use of in the current context. That is, a register selection vector may indicate that only a strict subset of the elements of a vector of read addresses comprise read addresses which are valid for this access request (i.e. are required to result in a corresponding data value read out from the corresponding read address being returned). This being the case the present techniques propose an approach according to which a read address compression procedure is applied to the set of active read addresses (as indicated by the register selection vector), such that as a result the set of active read addresses thereafter forms a contiguous group (i.e. all active read addresses are adjacent to one another, without being interspersed by inactive elements). A particular benefit of this compression procedure is that once completed it can result in a set of read addresses which, by virtue of the limited width of the vector representing them, can be serviced by a single read port. Moreover, the compression procedure is performed such that the active read addresses are shifted in a predetermined direction towards a predetermined element position. For example, they may be right-shifted towards the right-hand end of the vector. Equally, they could be left-shifted towards the left-hand end of the vector. Indeed the target predetermined element position (the "alignment target") can be arbitrarily chosen within the vector as can the direction by which that alignment target is approached. The alignment target could be somewhere central in the vector, with the shifting configured to wrap-around at an extremity of the vector. Further, when the register bank circuitry comprises, say, two read ports, the application of the read address compression procedure to two respective independent register selection vectors received from the processing circuitry, can enable those two access requests to be serviced in parallel, when a suitable choice of alignment target for the compressing procedure applied to each set of active read addresses allows there to be no overlap in element position between the two. Equally it should be appreciated that the present techniques are not limited to application to one or two read ports and examples with more than two read ports are also included in the intended scope.

In some examples, the register access circuitry is further configured to apply an inverse read address compression procedure to the read vector of data values, wherein the inverse read address compression procedure shifts elements of the read vector of data values in an inverse manner to the shifting of the set of active read addresses in the vector of read addresses in the read address compression procedure. This then enables the individual data values in the set of data values read out (in the read vector of data values) to be expanded back into the positions which correspond, element position-wise, to the register selection vector that caused them to be read out. They may then be provided in a useful format to their respective requester.

In some examples, the register access circuitry is further responsive to receipt from the processing circuitry of the register selection vector to perform a register selection vector compression procedure on the register selection vector, wherein the register selection vector compression procedure comprises: shifting in the register selection vector those element validity indicators identified as selected element positions in the predetermined direction towards the predetermined element position, such that the element validity indicators identified as selected element positions forms a contiguous group in the register selection vector ending on one side at the predetermined element position. Accordingly, the register selection vector itself may also be subjected to the same compression procedure as its associated vector of read addresses, and this can usefully provide a set of valid bits in the compressed register selection vector, which can then be used for a range of comparison, counting, and control purposes.

In some examples, the register access circuitry is configured to:
  receive in parallel a first register selection vector and a second register selection vector from the processing circuitry;
  perform a first read address compression procedure on a first vector of read addresses corresponding to the first register selection vector;
  perform a second read address compression procedure on a second vector of read addresses corresponding to the second register selection vector,
  wherein at least one of the predetermined direction and the predetermined element position differs between the first read address compression procedure and the second read address compression procedure;
  cause a first read vector of data values identified by a first set of active read addresses in the first vector of read addresses to be read out from the registers via a first selected read port of the at least one read port; and
  cause a second read vector of data values identified by a second set of active read addresses in the second vector of read addresses to be read out from the registers via a second selected read port of the at least one read port.

Accordingly, by configuring the two compression procedures such that at least one of the predetermined direction and the predetermined element position differs between them, the first and second sets of active read addresses can be manipulated such that they occupy mutually exclusive element positions and can therefore be read out in parallel to one another, thus increasing the readout bandwidth of the register bank circuitry.

In some examples, the register access circuitry is configured to perform a first register selection vector compression procedure on the first register selection vector and to perform a second register selection vector compression procedure on the second register selection vector,
  wherein the register access circuitry is configured to compare results of the first register selection vector compression procedure and the second register selection vector compression procedure to determine whether there would be an overlap between the first read vector of data values and the second read vector of data values,
  and wherein the register access circuitry is configured to cause the first read vector of data values and the second read vector of data values to be read out in parallel via the first selected read port and the second selected read port when there is not the overlap.

The application of the register selection vector compression procedure to the first and second register selection vectors facilitates the determination of whether there would be an overlap between the first and read vectors of data values, by the generation of compressed bit vectors that can readily be manipulated and compared.

In some examples, the register access circuitry is configured to perform a first register selection vector compression procedure on the first register selection vector and to perform a second register selection vector compression procedure on the second register selection vector,
  wherein the register access circuitry is configured to compare results of the first register selection vector compression procedure and the second register selection vector compression procedure to determine whether there would be an overlap between the first read vector of data values and the second read vector of data values,
  and when there is the overlap, the register access circuitry is configured to select a prioritised read vector of data values of the first read vector of data values and the second read vector of data values to be read out and to signal to the processing circuitry a non-prioritised register selection vector of the first register selection vector and the second register selection vector.

Accordingly, when it is established that there would be the overlap between the first and second read vectors of data values, i.e. they cannot be read out in parallel, the register access circuitry can be configured to select one of the two read vectors as taking priority over the other (the "prioritised read vector") and to cause that read vector to be read out first. There is a variety of ways in which priority between the read vectors may be defined.

In some examples, the register access circuitry further comprises prioritization circuitry configured to select the prioritised read vector of data values in dependence on at least one characteristic of the first register selection vector and the second register selection vector. The prioritization circuitry may be configured in a variety of ways to prioritize between the read vectors, but in such examples the prioritization depends at least in part on at least one characteristic of the register selection vectors themselves.

The at least one characteristic may take a variety of forms, but in some examples the at least one characteristic comprises a prioritization history of read port selection associated with the first read vector of data values and the second read vector of data values.

In some examples, the at least one characteristic comprises a prioritization history of register selection vector selection.

In some examples, the processing circuitry comprises an instruction queue to hold instructions of the sequence of instructions pending their issuance for execution and the at least one characteristic comprises an instruction queue age of an instruction associated with one of the first register selection vector and the second register selection vector. Accordingly, for example, the longer an instruction has been queued in the instruction queue, the more likely its register selection vector is to be prioritized.

In some examples the at least one characteristic comprises an indicated independence relative to other instructions of an instruction associated with one of the first register selection vector and the second register selection vector. Thus for example, an instruction whose operations do not depend on the operations caused by other instructions and/or whose operations are not the source of dependencies for the operations caused by other instructions may be prioritized, since it can be pushed through the execution pipeline without having to wait for those dependencies to resolve. Equally, the opposite policy could also be adopted, whereby instructions involved in many dependencies are prioritized, in order to allow those other dependent instructions to progress.

In some examples, the register access circuitry is configured to perform a first register selection vector compression procedure on the first register selection vector and to perform a second register selection vector compression procedure on the second register selection vector,
wherein the register access circuitry is configured to compare results of the first register selection vector compression procedure and the second register selection vector compression procedure to determine whether there would be an overlap between the first read vector of data values and the second read vector of data values,
and when there is the overlap, the register access circuitry is configured to apply a reconfiguration to at least one of the predetermined direction and the predetermined element position for at least one of the first read address compression procedure and the second read address compression procedure.

Accordingly, when there is the overlap between the first and second read vector of data values and one read vector of data values is prioritized over the other for read out, at least one of the predetermined direction and the predetermined element position can be adjusted such that, for the next pair of register selection vectors received the compression procedure for one or both is adjusted to rebalance the available readout bandwidth between them. This can prevent one dominating unfairly over the other.

In some examples, the reconfiguration comprises allocating more element positions to a non-prioritised register selection vector of the first register selection vector and the second register selection vector relative to a prioritised register selection vector of the first register selection vector and the second register selection vector. Thus at the next iteration the register selection vector which has lost out because the other register selection vector was prioritized will have more readout bandwidth allocated to it.

In accordance with one example configuration there is provided a system comprising:
the apparatus of any preceding claim, implemented in at least one packaged chip;
at least one system component; and
a board,
wherein the at least one packaged chip and the at least one system component are assembled on the board.

In some examples, there is a chip-containing product comprising the above system assembled on a further board with at least one other product component.

In accordance with one example configuration there is provided a method comprising:
performing data processing operations in response to a sequence of instructions;
holding data values in registers that are subject to the data processing operations and comprising at least one read port via which data values are read from the registers;
in response to receipt of a register selection vector, performing a read address compression procedure on a vector of read addresses, wherein the register selection vector comprises element validity indicators corresponding to address elements of the vector of read addresses,
wherein the read address compression procedure comprises:
identifying selected element positions and non-selected element positions based on the element validity indicators; and
shifting in the vector of read addresses a set of active read addresses given by the selected element positions in a predetermined direction towards a predetermined element position, such that the set of active read addresses forms a contiguous group in the vector of read addresses ending on one side at the predetermined element position; and
causing a read vector of data values identified by the set of active read addresses to be read out from the registers via a selected read port of the at least one read port.

In accordance with one example configuration there is provided a non-transitory computer-readable medium to store computer-readable code for fabrication of an apparatus comprising:
processing circuitry to perform data processing operations in response to a sequence of instructions; and
register bank circuitry to provide registers for holding data values that are subject to the data processing operations and comprising at least one read port via which data values are read from the registers,
wherein the register bank circuitry further comprises register access circuitry responsive to receipt from the processing circuitry of a register selection vector to perform a read address compression procedure on a vector of read addresses, wherein the register selection vector comprises element validity indicators corresponding to address elements of the vector of read addresses,
wherein the read address compression procedure comprises:
identifying selected element positions and non-selected element positions based on the element validity indicators; and
shifting in the vector of read addresses a set of active read addresses given by the selected element positions in a predetermined direction towards a predetermined element position, such that the set of active read addresses forms a contiguous group in the vector of read addresses ending on one side at the predetermined element position,
and wherein the register access circuitry is configured to cause a read vector of data values identified by the set of active read addresses to be read out from the registers via a selected read port of the at least one read port.

Particular embodiments will now be described with reference to the figures.

FIG. 1 illustrates an apparatus 100 in accordance with one embodiment. The apparatus is generally arranged with a pipeline structure, wherein data processing instructions to be executed by the apparatus are retrieved by a fetch stage 101, passed to a decode, rename, and dispatch stage 102, and then forwarded to a set of instruction queues 103. Each instruction queue 103 has an associated instruction queue (IQ) picker 104, which gathers the operands required for a decoded instruction to be executed before passing it, when ready for execution to the issue stage 105. The issue stage 105 issues decoded instructions to a corresponding execution unit 106 for execution. After execution a writeback stage 107 causes the result of the executed instruction to be written back to a destination register. Associated with the execution pipeline is the register bank circuitry 108, which comprises the register bank 109, providing registers for the purpose of temporarily holding values that are subject to the data processing operations carried out and defining the current state of the apparatus. The reading out of values in the registers of the register bank 109 is carried out via the read ports 110 and 111. The provision of two read ports for this example register bank is an implementation choice made by the system designer and the present techniques may also be applied to register banks with only one read port or with more than two read ports. The register bank circuitry 108 further comprises register bank read logic (circuitry) 112 and read port select logic (circuitry) 113. The register bank read logic (circuitry) 112 is configured to receive a source vector (a register selection vector) from one of the IQ pickers 104 defining a set of register addresses which it requires to be read out from the register bank 109. As will be described in more detail below with reference to the figures that follow, the register bank read logic (circuitry) 112 is configured to manipulate received register selection vectors to seek to gain improved bandwidth of read access via the read ports 110 and 111. In coordination with this, the read port select logic (circuitry) 113 is configured to manipulate the output from the read ports 110 and 111, such that the read out data can be provided to the respective IQ picker 104 in an expected format.

Figure 2:
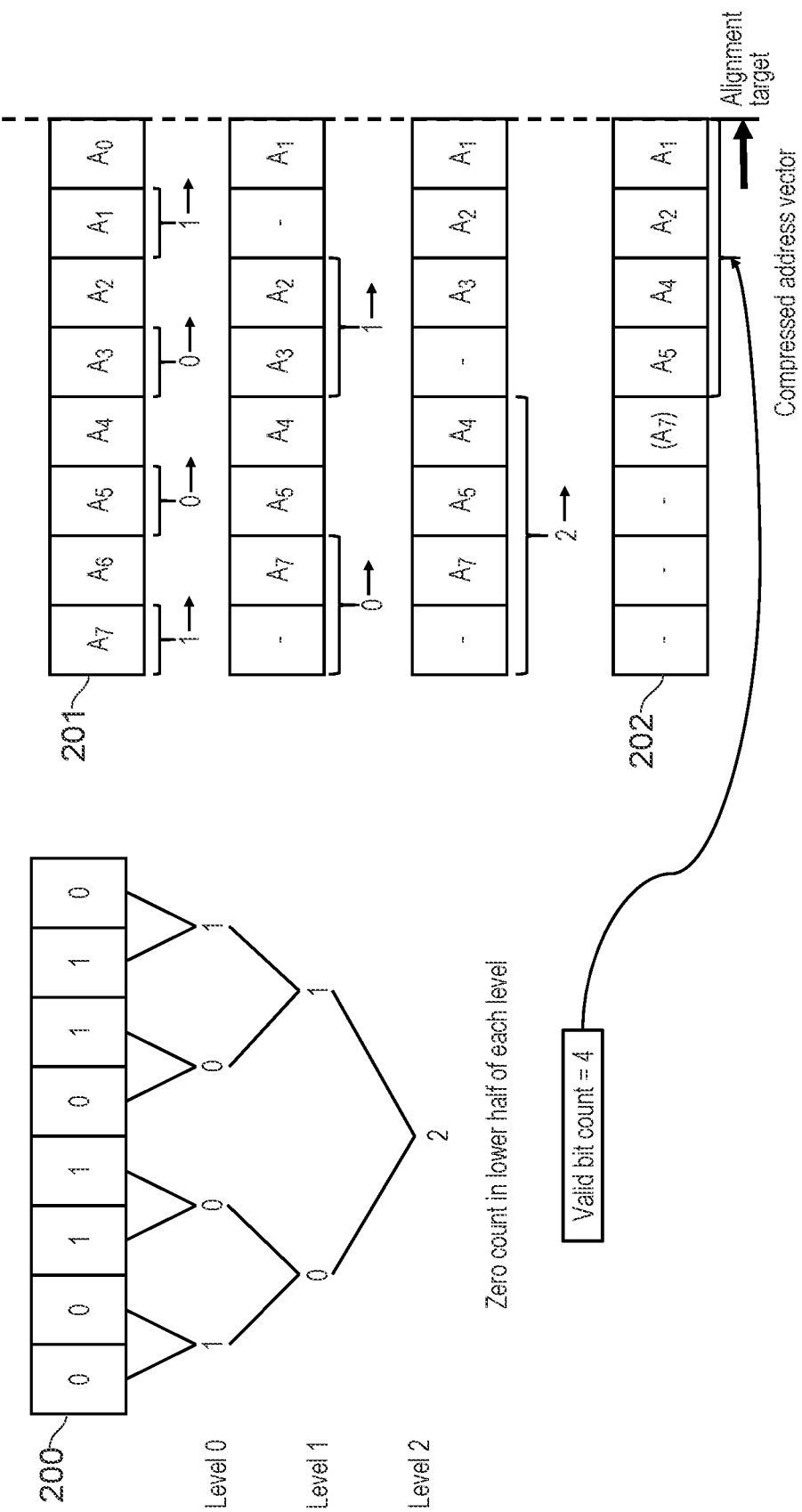
FIG. 2 schematically illustrates the use of a register selection vector to determine the compression of a vector of read addresses required in accordance with some example embodiments.

FIG. 2 shows a register selection vector 200 that corresponds to a vector of read addresses 201. The content of the register selection vector 200 is sparse, in that of the eight elements shown, only four of them are indicated as valid. It is to be noted that the illustrations of vectors herein use an exemplary length of eight elements, but this is arbitrary and the present techniques are not limited to application to any particular vector length. The content of the register selection vector 200 indicates which read addresses in the vector of read addresses 201 are valid and moreover steers the read address compression procedure which is applied to the vector of read addresses 201. The read address compression procedure is carried out in stages, whereby in a first stage the register selection vector 200 is processed at a granularity of pairs of elements. In a second stage, the register selection vector 200 is processed at a granularity of groups of four elements. In the final third stage, the register selection vector 200 is processed at a granularity of the full set of eight elements. Clearly, the number of processing stages will vary as the vector length varies. At each stage, for each of the groups of elements considered, the zero count of the elements in the lower half of that group is determined. This zero count then controls a shift applied to the upper half of the same group when superimposed on the vector of read addresses. Hence, as shown for the example element values in the figure, at the first stage ("Level 0") the four pairs of elements of the register selection vector 200 have a lower-half zero count of 1, 0, 0, and 1 respectively. The read address compression procedure applied to the vector of read addresses 201 is controlled by these values. Note that in this example the predetermined shift direction for elements of the vector of read addresses 201 is rightwards and the alignment target is the right-hand end of the vector of read addresses 201, i.e. the right-most element of the vector is predetermined element position towards which the shifts are made. Accordingly, in the first stage of the read address compression procedure applied to the vector of read addresses 201, the upper (left-hand) element of each of the four pairs of elements is right-shifted (or not) in dependence on the lower-half zero counts of 1, 0, 0, and 1 of the register selection vector 200. Thus, in the example shown, read address $A_7$ (at vector element position 7 (counting from the right starting at 0)) is right-shifted to overwrite $A_6$ (at vector element position 6) and read address $A_1$ (at vector element position 1) is right-shifted to overwrite $A_0$ (at vector element position 0). Then at the next stage ("Level 1") two groups of four elements are considered and have lower-half zero counts of 0 and 1 in the register selection vector 200. These values control the second stage of the read address compression procedure applied to the vector of read addresses 201, in which the upper (left-hand) pair of elements of each of the two groups of four elements are right-shifted (or not) in dependence these lower-half zero counts. Thus, in the example shown, the read address pair at element positions [7, 6] is not right-shifted and read address pair $\{A_3, A_2\}$ (at element positions [3, 2]) is right-shifted by one position. Finally, at the last stage ("Level 2") one group of eight elements are considered and have a lower-half zero count of 2 in the register selection vector 200. This value controls the third stage of the read address compression procedure applied to the vector of read addresses 201, in which the upper half of the elements is right-shifted (or not) in dependence this lower-half zero count. Thus, in the example shown, the set of read addresses at element positions [7, 6, 5, 4] is right-shifted by 2 positions to generate the final compressed address vector 202. Note that the read address $A_7$ at element position 4 is not valid, since the total valid bit count of the register selection vector 200 is 4. Hence one approach in using the compressed address vector 202 is to use the valid bit count and mask/ignore element positions corresponding to higher element positions.

Figure 3:
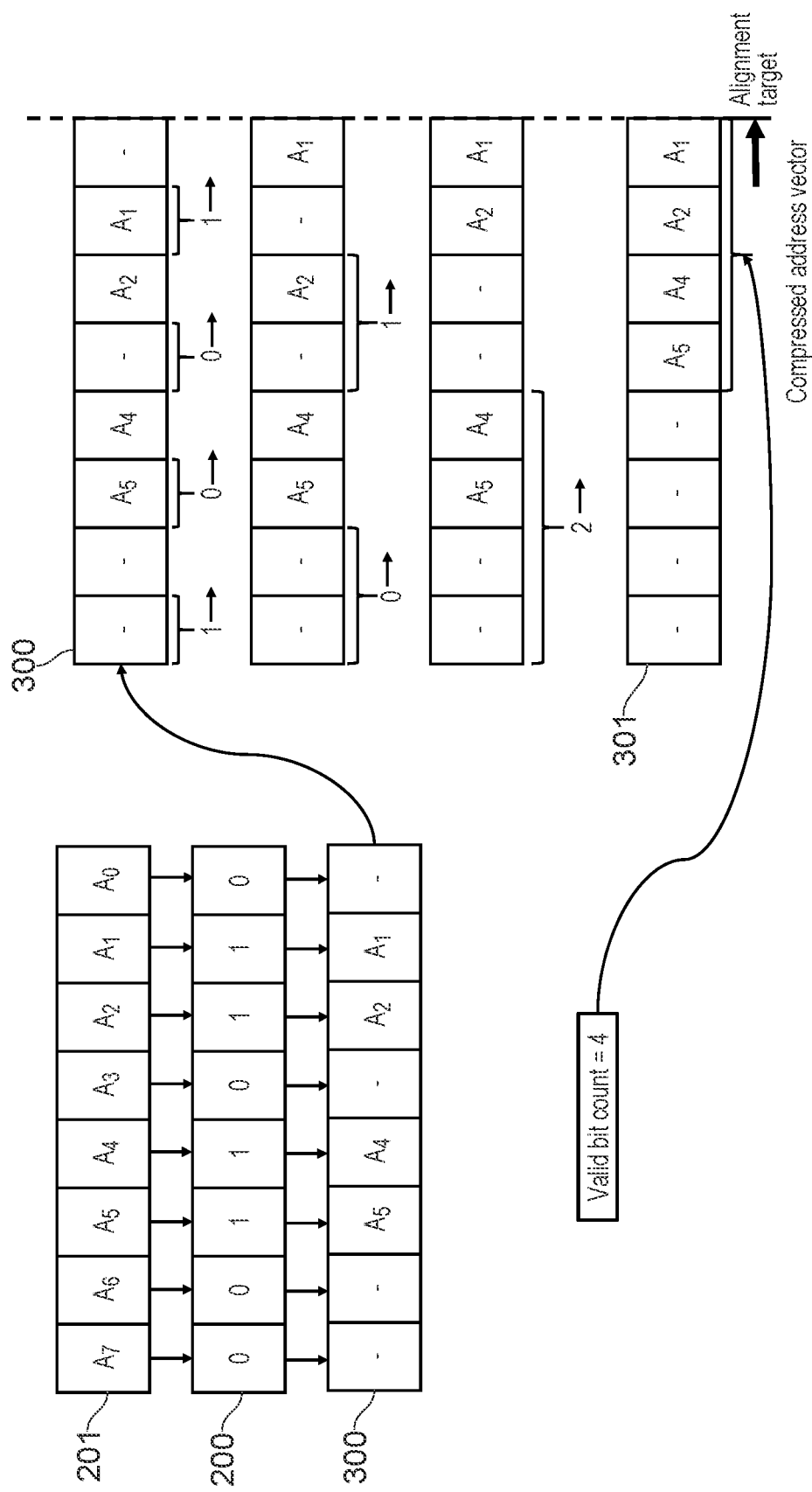
FIG. 3 schematically illustrates the use of a register selection vector to determine the compression of a vector of read addresses required in accordance with some example embodiments.

FIG. 3 shows a variant on the example shown in FIG. 2, based on the same a register selection vector 200 that corresponds to a vector of read addresses 201. In this example the register selection vector 200 is used in an initial step as a mask applied to the vector of read addresses 201 to generate a masked vector of read addresses 300, which only comprises valid read addressed. The read address compression procedure (as described with reference to FIG. 2) is then applied to this masked vector of read addresses 300 (right-shifting, alignment target at the right-most end of the vector), finally resulting in the (masked) compressed address vector 301.

Figure 4:
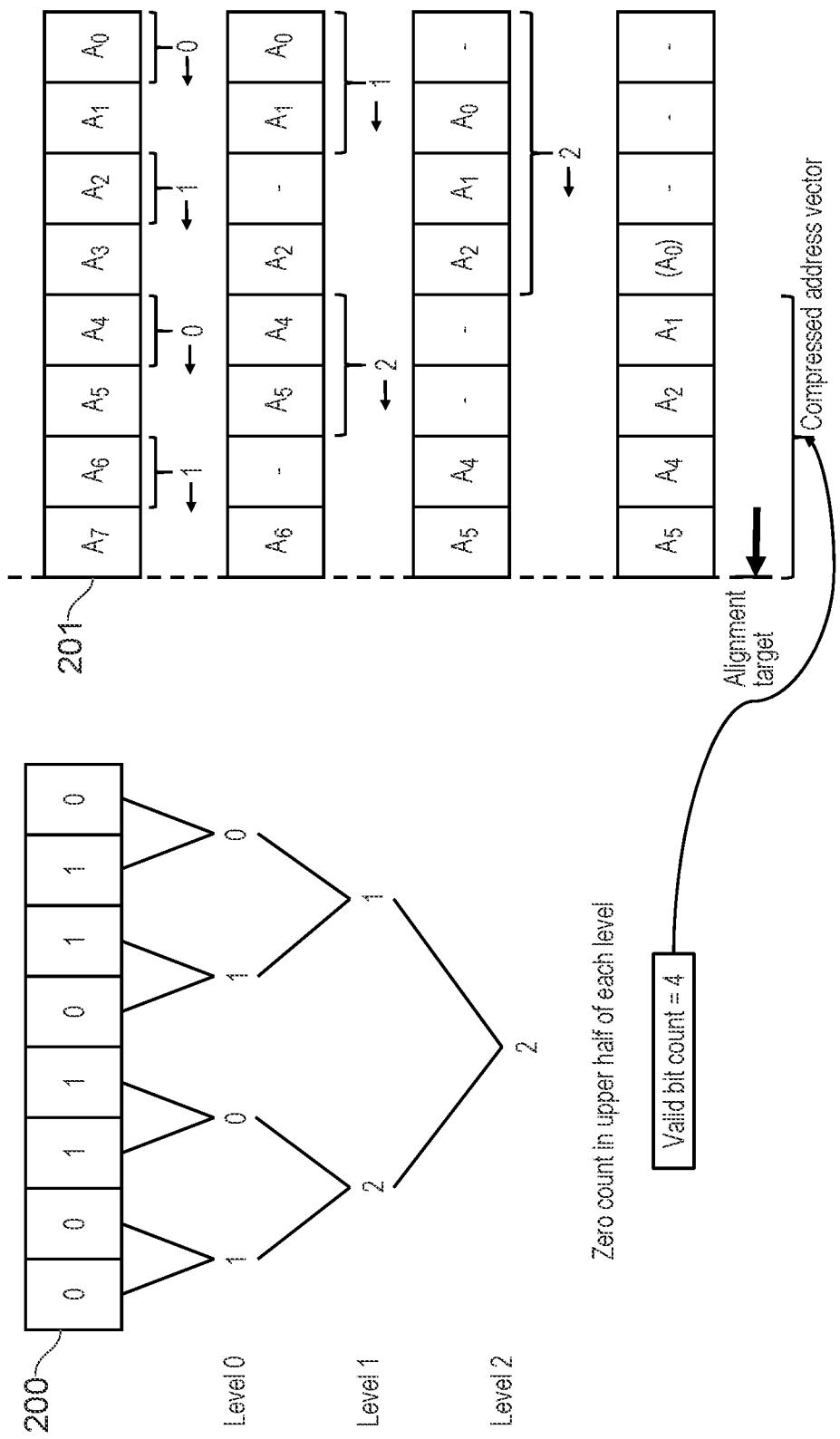
FIG. 4 schematically illustrates the use of a register selection vector to determine the compression of a vector of read addresses required in accordance with some example embodiments.
Figure 5:
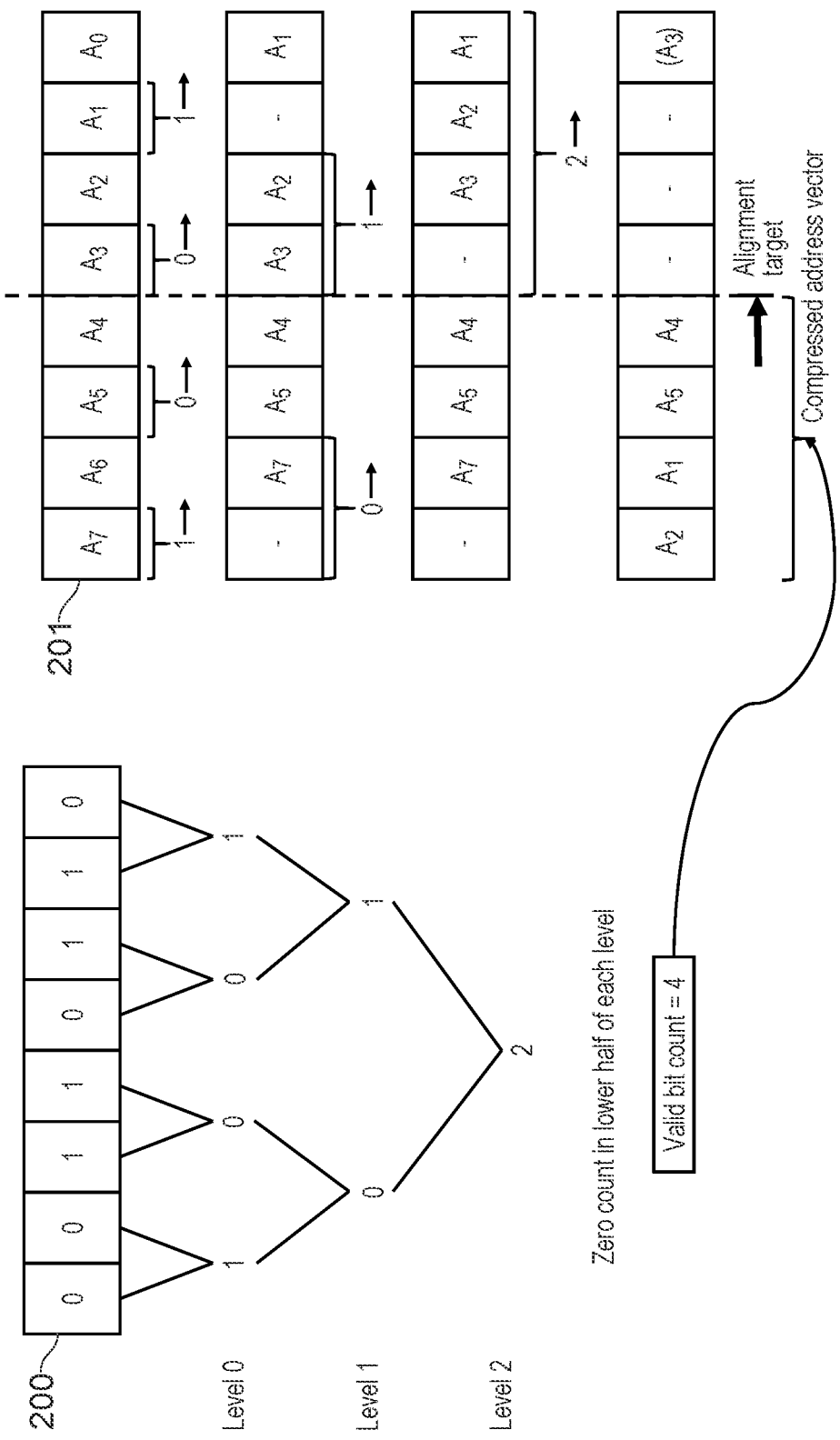
FIG. 5 schematically illustrates the use of a register selection vector to determine the compression of a vector of read addresses required in accordance with some example embodiments.
Figure 6:
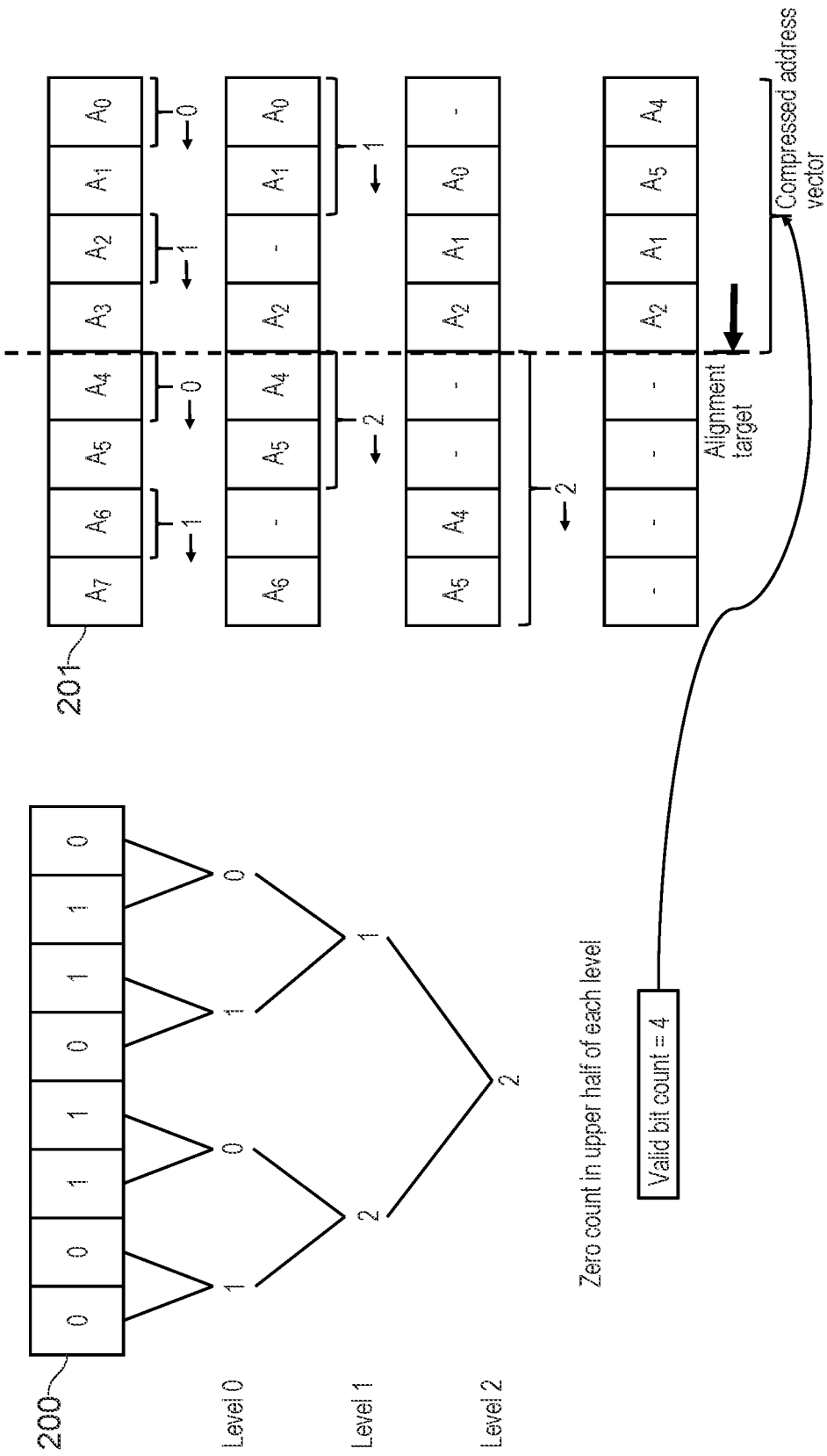
FIG. 6 schematically illustrates the use of a register selection vector to determine the compression of a vector of read addresses required in accordance with some example embodiments.

Whilst FIGS. 2 and 3 both represent read address compression procedures in which the shifting is rightwards and the alignment target is at the right-most end of the vector, FIGS. 4, 5, and 6 show other examples of read address compression procedures in which the shifting direction and/or the alignment target is different. Each is illustrated with reference to the same example register selection vector 200 applied to the same vector of read addresses 201. The example of FIG. 4 shows a read address compression procedure in which the shifting is leftwards and the alignment target is at the left-most end of the vector. The example of FIG. 5 shows a read address compression procedure in which the shifting is rightwards and the alignment target is at the centre of the vector (and the shifting wraps around from the right-most end to the left-most end of the vector). The example of FIG. 6 shows a read address compression procedure in which the shifting is leftwards and the alignment target is at the centre of the vector (and the shifting wraps around from the left-most end to the right-most end of the vector).

Figure 7:
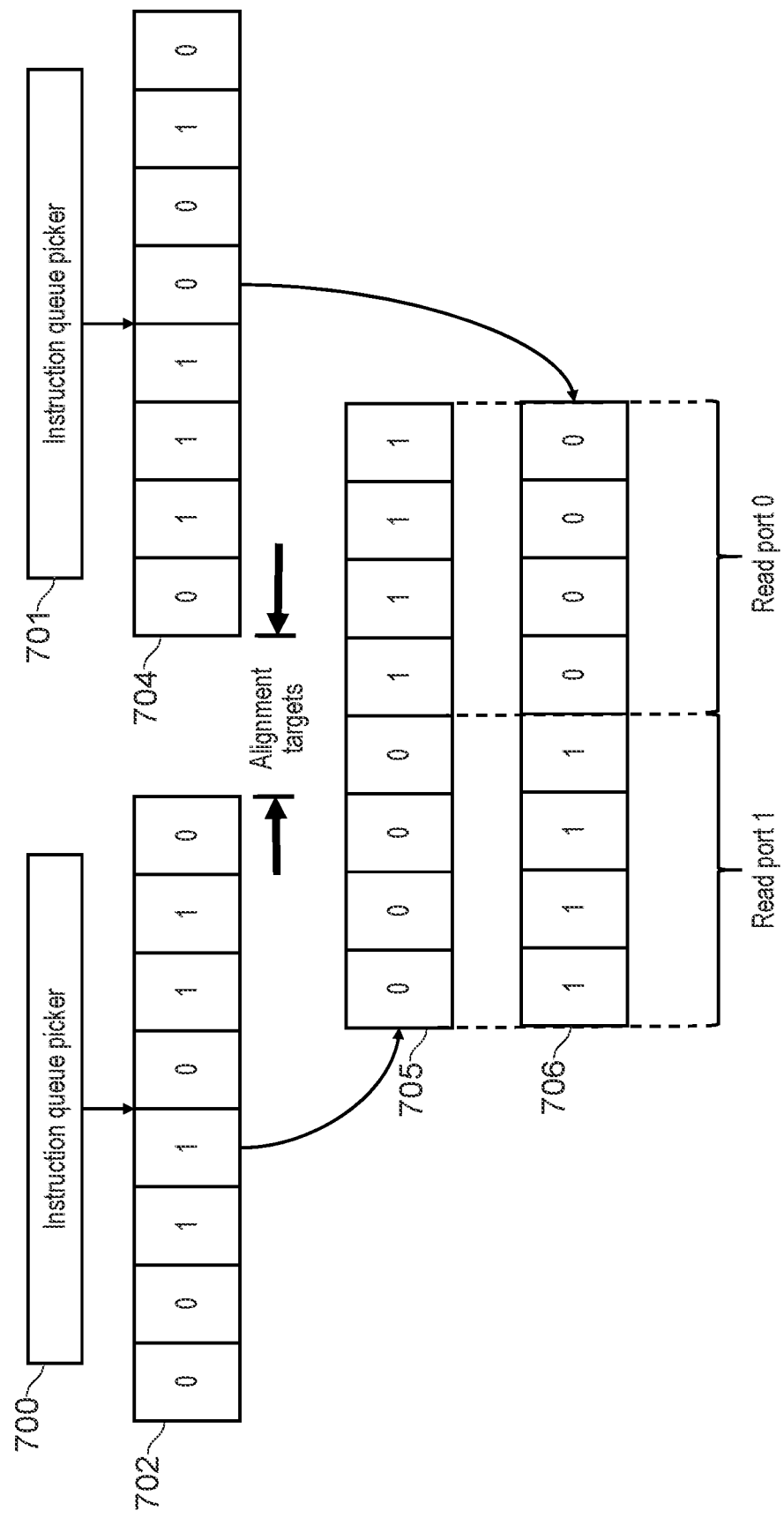
FIG. 7 schematically illustrates the comparison of two register selection vectors received from two instruction queue pickers to determine whether their corresponding compressed vectors of read addresses can be read out in parallel in accordance with some example embodiments.

Whichever configuration of read address compression procedure is used, the resulting compressed address vector can be used for a more efficient usage of the read port or read ports of the register bank, because the compression can allow the required data to be read out in a single action via a single read port. Furthermore, in cases where more than one register selection vector is received from more than one instruction queue picker, the compression of more than one vector of read addresses can allow those vectors of read addresses, which might otherwise have conflicted with one another, to be read out in parallel, either via a single read port (with a sufficient bandwidth) or via two (or more) read ports in parallel. FIG. 7 schematically illustrates the comparison of two register selection vectors 702, 704 received from two instruction queue pickers 700, 701 to determine whether their corresponding compressed vectors of read addresses 705, 706 can be read out in parallel in accordance with some examples. The content of the two register selection vectors 702, 704 differs and each is also subjected to a different read address compression procedure. Specifically, the read address compression procedure for register selection vectors 702 is right-shifting and the alignment target is the right-hand end of the vector. In coordination with this, the read address compression procedure for register selection vectors 704 is left-shifting and the alignment target is the left-hand end of the vector. In the example shown, it can be seen that the resulting compressed vectors of read addresses 705, 706 then do not overlap and accordingly can be read out in parallel via read ports 0 and 1. Note that whilst it is possible to determine whether or not there is overlap between the compressed vectors of read addresses 705, 706 by an element-by-element comparison of their respective content, a fast and early determination of the overlap can also be obtained by summing the valid bit counts of the two register selection vectors 702, 704. In the example shown (using 8-element vectors) if this sum were to exceed 8, then the overlap will occur. When the sum is 8 or less (as is the illustrated case), there is no overlap. The determination of the overlap condition (whether or not via the sum of the valid bit counts or by comparing the result of the read address compression procedures applied to the two register selection vectors) can then determine whether or not to apply the read address compression procedures to the corresponding vector of read addresses. A faster generation of the compressed address vectors can be achieved by performing the read address compression procedures on the register selection vectors and the vectors of read addresses in parallel or a slower, more power efficient generation of the compressed address vectors can be achieved by only performing the read address compression procedures on the vectors of read addresses when it has first been determined, with reference to the register selection vectors, that there is no overlap. Note that for clarity of illustration FIG. 7 gives an example with two register selection vectors 702, 704 received from two instruction queue pickers 700, 701, but the techniques described are equally applicable to more than two register selection vectors/instruction queue pickers. For example, in the case of receiving four register selection vectors, the read address compression procedures could respectively: right-shift/align to the right; left-shift/align to the left; right-shift/align to the centre; and left-shift/align to the centre. Clearly, the sum of valid bit counts of all four register selection vectors would then need to fit within the vector length involved for no overlap to occur between any of the corresponding compressed vectors of read addresses.

Figure 8:
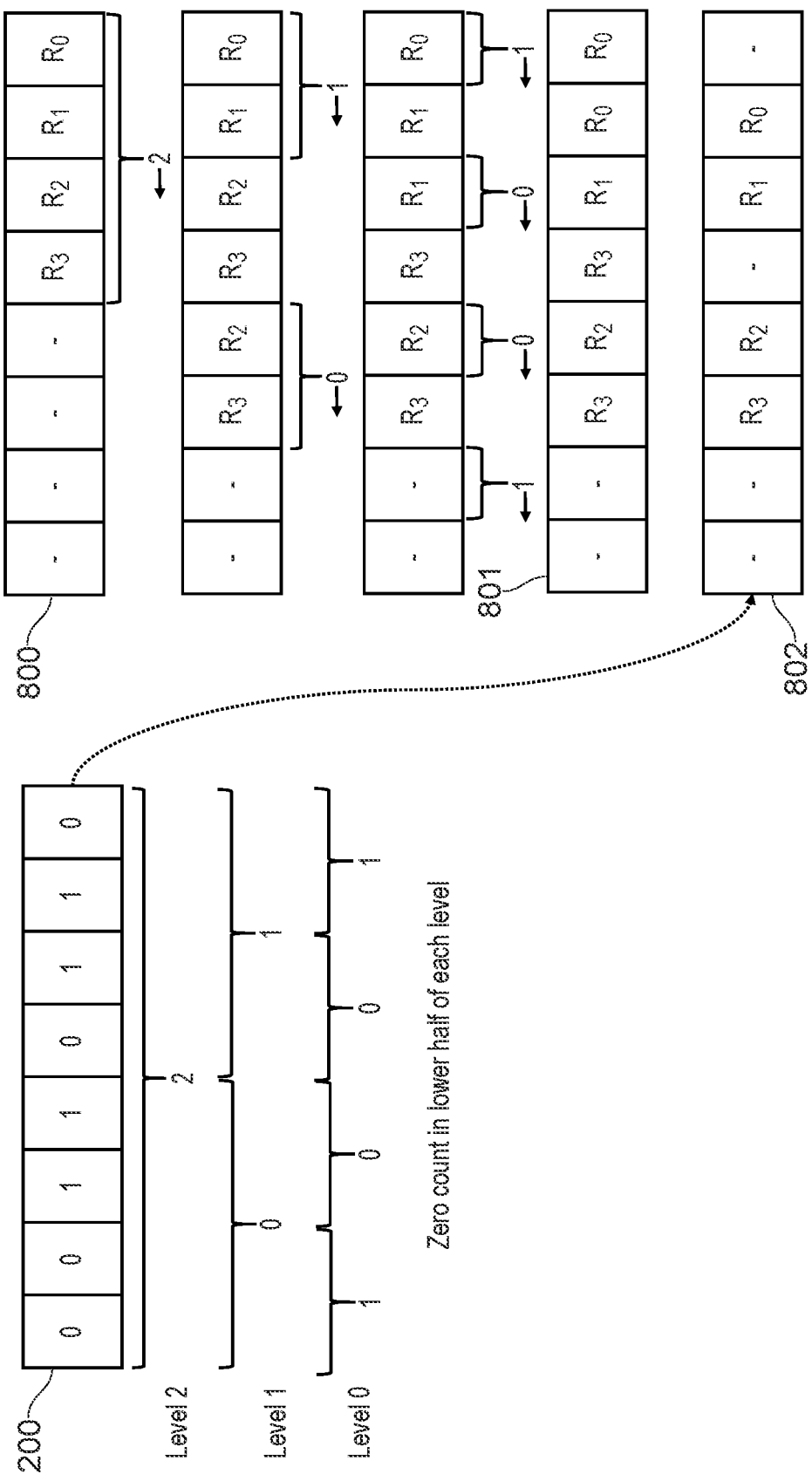
FIG. 8 schematically illustrates the use of a register selection vector to determine the de-compression of a read vector of data values in accordance with some example embodiments.

Once a readout via at least one read port has been carried out as specified by a compressed vector of read addresses, the resulting read vector of data values could be provided as-is, but would then need correct interpretation due to the compression applied to its corresponding register selection vector. FIG. 8 schematically illustrates the use of a register selection vector to determine the de-compression of a read vector of data values 800 in accordance with some examples. This de-compression of the read vector of data values is essentially the inverse of the read address compression procedure applied to the vector of read addresses. Accordingly, like the read address compression procedure, the de-compression of a read vector of data values is carried out in stages. The granularity of elements handled at each stage is the inverse of the read address compression procedure. Hence, in a first stage ("Level 0") the register selection vector 200 is processed at a granularity of the full set of eight element. In the second stage, the register selection vector 200 is processed at a granularity of two groups of four elements. In the final third stage, the register selection vector 200 is processed at a granularity of four pairs of elements. Clearly, the number of processing stages will vary as the vector length varies. At each stage, for each of the groups of elements considered, the zero count of the elements in the lower half of that group is determined. This zero count then controls a shift applied to the lower half of the same group when superimposed on the vector of read addresses. Hence, as shown for the example element values in the figure, at the first stage ("Level 2") the full set of elements of the register selection vector 200 has a lower-half zero count of 2. Note that in this example the predetermined shift direction for elements of the read vector of data values 800 is leftwards (inverting the direction of the read address compression procedure). Accordingly, in the first stage of the de-compression of the read vector of data values applied to the read vector of data values 800, the lower (right-hand) half of the vector is left-shifted by 2 element places (as determined by the lower-half zero count of 2 of the register selection vector 200). Thus, in the example shown, data values $R_3$, $R_2$, $R_1$, $R_0$ (at vector element positions 3, 2, 1, 0 (counting from the right starting at 0)) are left-shifted to vector element positions 5, 4, 3, 2. Note that the content of element positions 1, 0 remains after this shift, i.e. the left shift could be described as a left-copy. Then at the next stage ("Level 1") two groups of four elements are considered and have lower-half zero counts of 0 and 1 in the register selection vector 200. Thus, in the example shown, the pair of data values {$R_3$, $R_2$} at element positions [4, 5] is not left-shifted and the pair of data values {$R_1$, $R_0$} at element positions [1, 0]) is left-shifted (copied) by one position. Finally, at the last stage ("Level 0") four pairs of elements are considered and have lower-half zero counts of 1, 0, 0, 1 respectively in the register selection vector 200. Thus, in the example shown, the data value $R_0$ at element position 0 is left-shifted (copied) by one position, the data values $R_2$ and $R_1$ at element positions [4, 2] are not left-shifted, and the data value {−} at element position 6 is left-shifted (copied) by one position. Note that the data values at element positions 7, 6, 3, 0 in the decompressed read vector of data values 801 are in any regard not valid, since they correspond to invalid elements of the register selection vector 200. If required the decompressed read vector of data values 801 can therefore be masked by the register selection vector 200 to generate a final decompressed read vector of data values 802 which comprises only valid data values.

Figure 9:
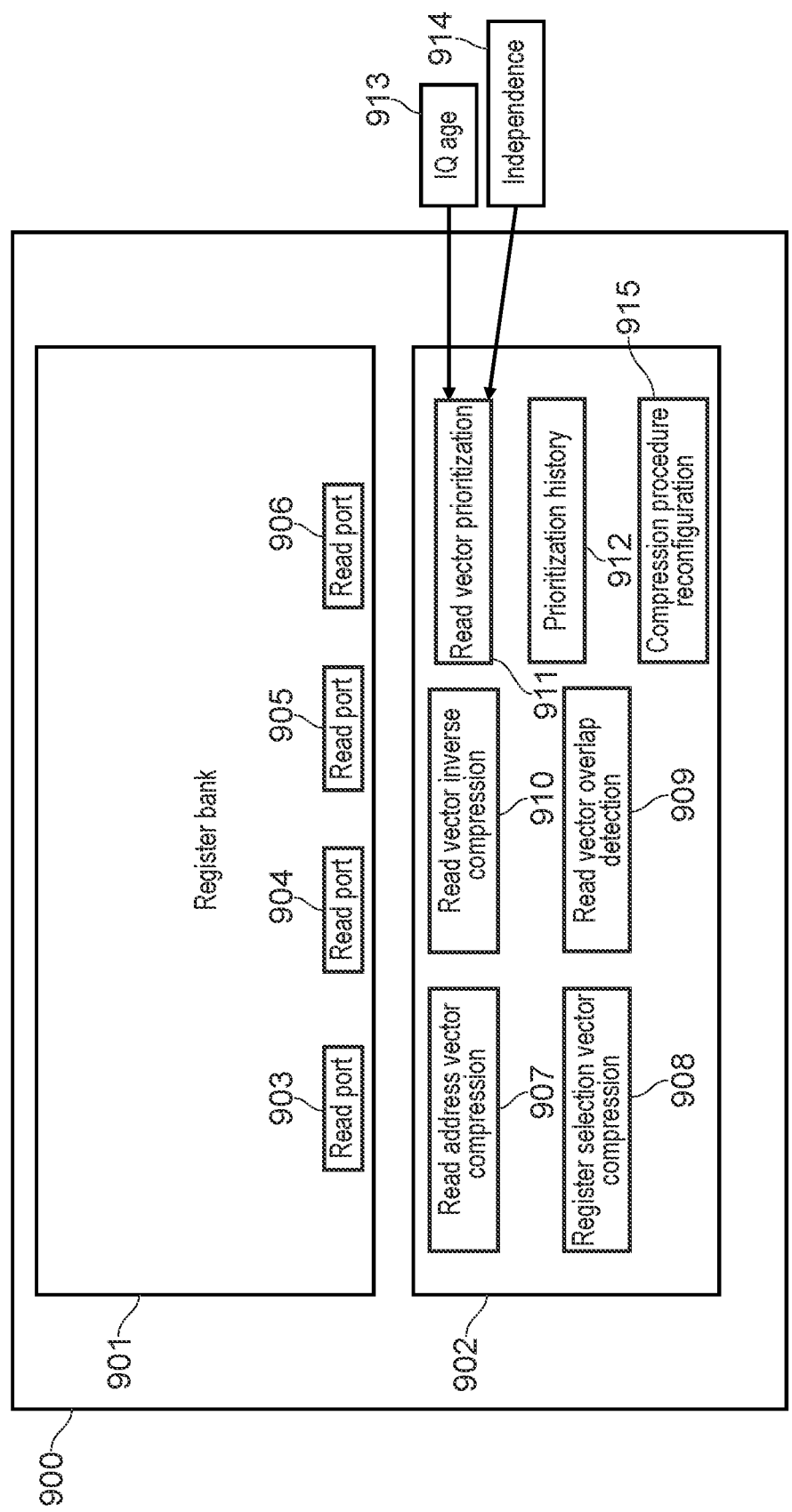
FIG. 9 schematically illustrates a register bank and associated register access circuitry in accordance with some example embodiments.

FIG. 9 schematically illustrates register bank circuitry 900 comprising a register bank 901 and associated register access circuitry 902 in accordance with some examples. The register bank 901 has four read ports 903, 904, 905, 906 via which data values stored in the registers can be read out. The register access circuitry 902 is arranged to receive register selection vectors and to administer how the four read ports 903, 904, 905, 906 are then used to service those register read requests. The register access circuitry's handling of the register selection vectors comprises applying read address compression procedures on corresponding vectors of read addresses, where the results of those read address compression procedures (compressed address vectors) are then used to control the data readouts via the four read ports. Accordingly, the register access circuitry 902 comprises read address vector compression circuitry 907 that performs the read address compression procedures. Similarly, the register access circuitry 902 comprises register selection vector compression circuitry 908 that performs the corresponding compression procedures on the register selection vectors. The register access circuitry 902 further comprises read vector overlap detection circuitry 909, such that it can be determined whether the compressed address vectors can be used for parallel data readouts via one or more of the four read ports. Once some data values have been read out via a read port, the read vector inverse compression circuitry 910 applies an inverse read address compression procedure to the read vector of data values, such that they can then be returned to the requester (e.g. an instruction queue picker) in the same vectorised ordering as the register selection vector received.

The register access circuitry 902 also comprises read vector prioritization circuitry 911 that, in the event of an overlap being detected by the read vector overlap detection circuitry 909, determines which of the two (or more) overlapping read vectors will be prioritized, i.e. will be read out first, causing the other(s) to be delayed. The read vector prioritization circuitry 911 can base this decision on one or more factors depending on the implementation. For example, broadly speaking a read request may be prioritized in dependence on at least one characteristic related to its register selection vector, such as the instruction queue picker from which it has been received. Certain instruction queue pickers could be prioritized in order to reduce latency associated with the corresponding instruction queue. Equally, the decision could also depend on a prioritization history of read port selection associated with the read requests. To support this, register access circuitry 902 also comprises prioritization history circuitry 912, which is arranged to store information indicative of previous prioritizations. Hence, in one example, the prioritization history circuitry 912 is arranged to store a rolling history window of previous prioritizations, when selecting between read requests (i.e. register selection vectors received). Fair usage of the read ports can be supported this way. Equally, the read vector prioritization circuitry 911 and/or the prioritization history circuitry 912 can be configured to apply an intentional bias, such that certain requesters (e.g. instruction queue pickers) can be guaranteed a higher access rate than certain others. The read vector prioritization circuitry 911 can also base its decisions on other information received. Two example of this are shown in the example in FIG. 9. One example is making use of instruction queue age information 913, whereby register selection vectors are received with an indication of how long the instruction which caused this register selection vector to be sent has been queued in an instruction queue. The longer an instruction has been queued, the more its register selection vector is prioritized. The age indication could be a single bit, indicating that the instruction has been queued for above a threshold period. Another example of other information on which the read vector prioritization circuitry 911 can base its decisions is shown by the independence information 914. Register selection vectors can thus be received with additional information indicating the relative dependence (or not) of the instruction associated with the register selection vector on other instructions. Thus for example, an instruction whose operations do not depend on the operations caused by other instructions and/or whose operations are not the source of dependencies for the operations caused by other instructions may be prioritized, since it can be pushed through the execution pipeline without having to wait for those dependencies to resolve. Equally, the opposite policy could also be adopted, whereby instructions involved in many dependencies are prioritized, in order to allow those other dependent instructions to progress.

The register access circuitry 902 also comprises compression procedure reconfiguration circuitry 915. The two key control parameters for each read address compression procedure are the direction in which elements are shifted (i.e. the "predetermined direction") and the alignment target of that shifting (i.e. the "predetermined element position"). These may be kept unvaried when the readout performance of the register bank circuitry 900 (and hence of the wider data processing apparatus of which it forms part) is satisfactory. However, it is envisaged that improved performance (perhaps for particular data processing operations) can be achieved at times by modification of either or both of these parameters for some read address compression procedures. For example, in the event of an overlap between the results of two read address compression procedures, whilst at that moment one of the two read requests must be selection for prioritization, modification of either or both of these parameters may be able to result in no overlap for a subsequent similar pair of read address compression procedures. To give one example of a policy that could be implemented by the compression procedure reconfiguration circuitry 915, when an overlap is detected (by the read vector overlap detection circuitry 909)—causing one read request to be "killed" (i.e. suppressed at this iteration and in need of reissuance to be actioned)—the alignment target can be varied in position to seek to avoid the overlap. This adjustment can be controlled empirically, i.e. system performance is monitored and when the variation in alignment target (e.g. by a predetermined increment) improves performance, the new alignment target is adopted. A further variation in the alignment target may even be carried out. Conversely, when the variation in alignment target degrades performance, the new alignment target is rejected and reversed at the next iteration.

Figures 10A, 10B:
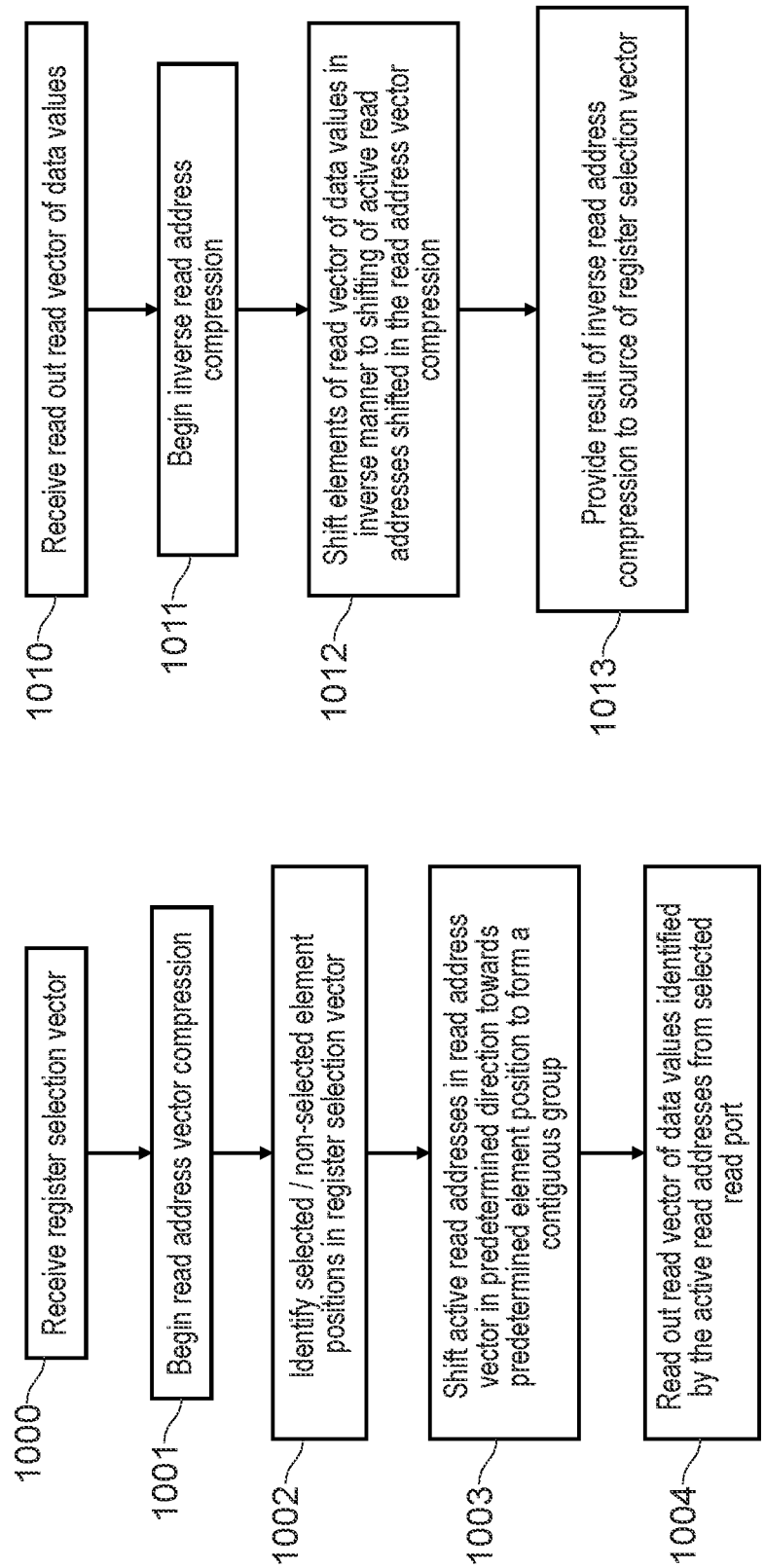
FIGS. 10a and 10b are flow diagrams showing sequences of steps taken when performing a read address compression procedure and an inverse read address compression procedure in accordance with some example embodiments.

FIGS. 10a and 10b are flow diagrams showing sequences of steps taken when performing a read address compression procedure and an inverse read address compression procedure in accordance with some examples. In FIG. 10a, the first step before the read address compression procedure itself begins is the reception at step 1000 of a register selection vector. This triggers the read address vector compression to start at step 1001. Then, at step 1002, selected and non-selected element positions in register selection vector are identified and these bit values control the shifting carried out in step 1003, whereby active read addresses in the read address vector are shifted in the predetermined direction towards the predetermined element position to form a contiguous group. Finally at step 1004 the compressed read address vector is used for the control of reading out a read vector of data values identified by the active read addresses from a selected read port. In FIG. 10b, the first step before the inverse read address compression procedure itself begins is the reception at step 1010 of a read vector of data values. This triggers the inverse read address compression to start at step 1011. Then, at step 1012, elements of the read vector of data values are shifted in an inverse manner to the shifting of active read addresses shifted in the read address vector compression procedure. Finally at step 1013, the result of the inverse read address compression is provided to the source of register selection vector received (at step 1000).

Figure 11:
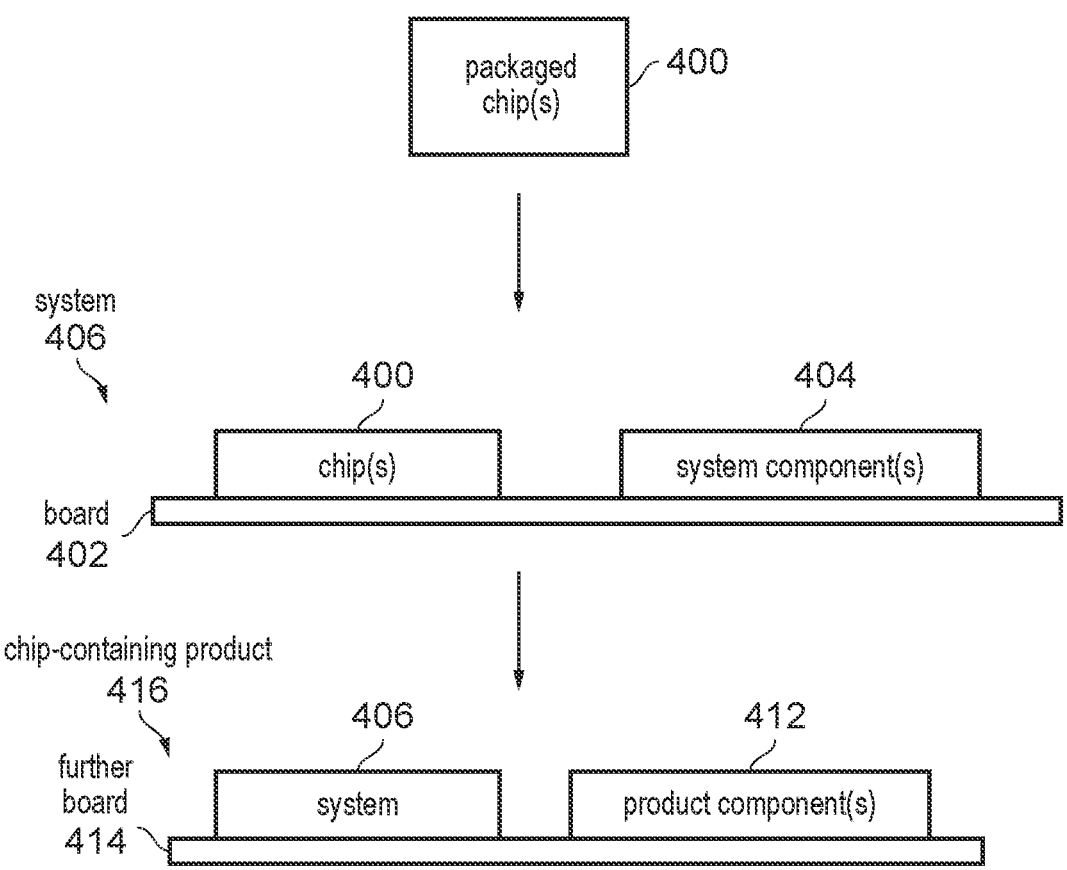
FIG. 11 schematically illustrates a system and a chip-containing product according to some example embodiments.

FIG. 11 schematically illustrates a system and a chip-containing product according to some examples. The concepts described herein may be embodied in a system comprising at least one packaged chip. The apparatus described earlier is implemented in the at least one packaged chip (either being implemented in one specific chip of the system, or distributed over more than one packaged chip). The at least one packaged chip is assembled on a board with at least one system component. A chip-containing product may comprise the system assembled on a further board with at least one other product component. The system or the chip-containing product may be assembled into a housing or onto a structural support (such as a frame or blade).

As shown in FIG. 11, one or more packaged chips 400, with the described above implemented on one chip or distributed over two or more of the chips, are manufactured by a semiconductor chip manufacturer. In some examples, the chip product 400 made by the semiconductor chip manufacturer may be provided as a semiconductor package which comprises a protective casing (e.g. made of metal, plastic, glass or ceramic) containing the semiconductor devices implementing the apparatus described above and connectors, such as lands, balls or pins, for connecting the semiconductor devices to an external environment. Where more than one chip 400 is provided, these could be provided as separate integrated circuits (provided as separate packages), or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (i.e. small modular chips with particular functionality) may itself be referred to as a chip. A chiplet may be packaged individually in a semiconductor package and/or together with other chiplets into a multi-chiplet semiconductor package (e.g. using an interposer, or by using three-dimensional integration to provide a multi-layer chiplet product comprising two or more vertically stacked integrated circuit layers).

The one or more packaged chips 400 are assembled on a board 402 together with at least one system component 404 to provide a system 406. For example, the board may comprise a printed circuit board. The board substrate may be made of any of a variety of materials, e.g. plastic, glass, ceramic, or a flexible substrate material such as paper, plastic or textile material. The at least one system component 404 comprise one or more external components which are not part of the one or more packaged chip(s) 400. For example, the at least one system component 404 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 416 is manufactured comprising the system 406 (including the board 402, the one or more chips 400 and the at least one system component 404) and one or more product components 412. The product components 412 comprise one or more further components which are not part of the system 406. As a non-exhaustive list of examples, the one or more product components 412 could include a user input/output device such as a keypad, touch screen, microphone, loudspeaker, display screen, haptic device, etc.; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 406 and one or more product components 412 may be assembled on to a further board 414.

The board 402 or the further board 414 may be provided on or within a device housing or other structural support (e.g. a frame or blade) to provide a product which can be handled by a user and/or is intended for operational use by a person or company. The system 406 or the chip-containing product 416 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/or a control system for controlling public infrastructure equipment such as smart motorway or traffic lights.

Certain example configurations embodying the present techniques are set out in the following numbered clauses.

Clause 1. Apparatus comprising:
processing circuitry to perform data processing operations in response to a sequence of instructions; and
register bank circuitry to provide registers for holding data values that are subject to the data processing operations and comprising at least one read port via which data values are read from the registers,
wherein the register bank circuitry further comprises register access circuitry responsive to receipt from the processing circuitry of a register selection vector to perform a read address compression procedure on a vector of read addresses, wherein the register selection vector comprises element validity indicators corresponding to address elements of the vector of read addresses,
wherein the read address compression procedure comprises:
identifying selected element positions and non-selected element positions based on the element validity indicators; and
shifting in the vector of read addresses a set of active read addresses given by the selected element positions in a predetermined direction towards a predetermined element position, such that the set of active read addresses forms a contiguous group in the vector of read addresses ending on one side at the predetermined element position, and wherein the register access circuitry is configured to cause a read vector of data values identified by the set of active read addresses to be read out from the registers via a selected read port of the at least one read port.

Clause 2. The apparatus of Clause 1, wherein the register access circuitry is further configured to apply an inverse read address compression procedure to the read vector of data values, wherein the inverse read address compression procedure shifts elements of the read vector of data values in an inverse manner to the shifting of the set of active read addresses in the vector of read addresses in the read address compression procedure.

Clause 3. The apparatus of Clause 1 or Clause 2, wherein the register access circuitry is further responsive to receipt from the processing circuitry of the register selection vector to perform a register selection vector compression procedure on the register selection vector, wherein the register selection vector compression procedure comprises:

shifting in the register selection vector those element validity indicators identified as selected element positions in the predetermined direction towards the predetermined element position, such that the element validity indicators identified as selected element positions forms a contiguous group in the register selection vector ending on one side at the predetermined element position.

Clause 4. The apparatus of any preceding Clause, wherein the register access circuitry is configured to:

receive in parallel a first register selection vector and a second register selection vector from the processing circuitry;

perform a first read address compression procedure on a first vector of read addresses corresponding to the first register selection vector;

perform a second read address compression procedure on a second vector of read addresses corresponding to the second register selection vector, wherein at least one of the predetermined direction and the predetermined element position differs between the first read address compression procedure and the second read address compression procedure;

cause a first read vector of data values identified by a first set of active read addresses in the first vector of read addresses to be read out from the registers via a first selected read port of the at least one read port; and cause a second read vector of data values identified by a second set of active read addresses in the second vector of read addresses to be read out from the registers via a second selected read port of the at least one read port.

Clause 5. The apparatus of Clause 4, when dependent on Clause 3, wherein the register access circuitry is configured to perform a first register selection vector compression procedure on the first register selection vector and to perform a second register selection vector compression procedure on the second register selection vector, wherein the register access circuitry is configured to compare results of the first register selection vector compression procedure and the second register selection vector compression procedure to determine whether there would be an overlap between the first read vector of data values and the second read vector of data values, and wherein the register access circuitry is configured to cause the first read vector of data values and the second read vector of data values to be read out in parallel via the first selected read port and the second selected read port when there is not the overlap.

Clause 6. The apparatus of Clause 4, when dependent on Clause 3, wherein the register access circuitry is configured to perform a first register selection vector compression procedure on the first register selection vector and to perform a second register selection vector compression procedure on the second register selection vector, wherein the register access circuitry is configured to compare results of the first register selection vector compression procedure and the second register selection vector compression procedure to determine whether there would be an overlap between the first read vector of data values and the second read vector of data values, and when there is the overlap, the register access circuitry is configured to select a prioritised read vector of data values of the first read vector of data values and the second read vector of data values to be read out and to signal to the processing circuitry a non-prioritised register selection vector of the first register selection vector and the second register selection vector.

Clause 7. The apparatus of Clause 6, wherein the register access circuitry further comprises prioritization circuitry configured to select the prioritised read vector of data values in dependence on at least one characteristic of the first register selection vector and the second register selection vector.

Clause 8. The apparatus of Clause 7, wherein the at least one characteristic comprises a prioritization history of read port selection associated with the first read vector of data values and the second read vector of data values.

Clause 9. The apparatus of Clause 7 or Clause 8, wherein the at least one characteristic comprises a prioritization history of register selection vector selection.

Clause 10. The apparatus of any of Clauses 7-9, wherein the processing circuitry comprises an instruction queue to hold instructions of the sequence of instructions pending their issuance for execution and the at least one characteristic comprises an instruction queue age of an instruction associated with one of the first register selection vector and the second register selection vector.

Clause 11. The apparatus of any of Clauses 7-10, wherein the at least one characteristic comprises an indicated independence relative to other instructions of an instruction associated with one of the first register selection vector and the second register selection vector.

Clause 12. The apparatus of Clause 4, when dependent on Clause 3, wherein the register access circuitry is configured to perform a first register selection vector compression procedure on the first register selection vector and to perform a second register selection vector compression procedure on the second register selection vector, wherein the register access circuitry is configured to compare results of the first register selection vector compression procedure and the second register selection vector compression procedure to determine whether there would be an overlap between the first read vector of data values and the second read vector of data values, and when there is the overlap, the register access circuitry is configured to apply a reconfiguration to at least one of the predetermined direction and the predetermined element position for at least one of the first read address compression procedure and the second read address compression procedure.

Clause 13. The apparatus of Clause 12, wherein the reconfiguration comprises allocating more element positions to a non-prioritised register selection vector of the first register selection vector and the second register selection vector relative to a prioritised register selection vector of the first register selection vector and the second register selection vector.

Clause 14. A system comprising:
the apparatus of any preceding Clause, implemented in at least one packaged chip;
at least one system component; and
a board,
wherein the at least one packaged chip and the at least one system component are assembled on the board.

Clause 15. A chip-containing product comprising the system of Clause 14 assembled on a further board with at least one other product component.

Clause 16. A method comprising:
performing data processing operations in response to a sequence of instructions;
holding data values in registers that are subject to the data processing operations and comprising at least one read port via which data values are read from the registers;
in response to receipt of a register selection vector, performing a read address compression procedure on a vector of read addresses, wherein the register selection vector comprises element validity indicators corresponding to address elements of the vector of read addresses,
wherein the read address compression procedure comprises:
identifying selected element positions and non-selected element positions based on the element validity indicators; and
shifting in the vector of read addresses a set of active read addresses given by the selected element positions in a predetermined direction towards a predetermined element position, such that the set of active read addresses forms a contiguous group in the vector of read addresses ending on one side at the predetermined element position; and
causing a read vector of data values identified by the set of active read addresses to be read out from the registers via a selected read port of the at least one read port.

Clause 17. A non-transitory computer-readable medium to store computer-readable code for fabrication of an apparatus comprising:
processing circuitry to perform data processing operations in response to a sequence of instructions; and
register bank circuitry to provide registers for holding data values that are subject to the data processing operations and comprising at least one read port via which data values are read from the registers, wherein the register bank circuitry further comprises register access circuitry responsive to receipt from the processing circuitry of a register selection vector to perform a read address compression procedure on a vector of read addresses, wherein the register selection vector comprises element validity indicators corresponding to address elements of the vector of read addresses,
wherein the read address compression procedure comprises:
identifying selected element positions and non-selected element positions based on the element validity indicators; and
shifting in the vector of read addresses a set of active read addresses given by the selected element positions in a predetermined direction towards a predetermined element position, such that the set of active read addresses forms a contiguous group in the vector of read addresses ending on one side at the predetermined element position,
and wherein the register access circuitry is configured to cause a read vector of data values identified by the set of active read addresses to be read out from the registers via a selected read port of the at least one read port.

In brief overall summary, apparatuses, systems, chip-containing products, methods and computer-readable media are disclosed relating to register bank circuitry providing registers holding data values and comprising at least one read port. On receipt of a register selection vector a read address compression procedure is performed on a vector of read addresses. The register selection vector comprises element validity indicators corresponding to address elements of the vector of read addresses. The compression procedure comprises identifying selected/non-selected element positions and shifting in the vector of read addresses a set of active read addresses in a predetermined direction towards a predetermined element position to form a contiguous group in the vector of read addresses ending on one side at the predetermined element position. A read vector of data values identified by the set of active read addresses is read out from the registers via a selected read port of the at least one read port.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

We claim:

1. Apparatus comprising:
processing circuitry to perform data processing operations in response to a sequence of instructions; and
register bank circuitry to provide registers for holding data values that are subject to the data processing operations and comprising at least one read port via which data values are read from the registers,
wherein the register bank circuitry further comprises register access circuitry responsive to receipt from the processing circuitry of a register selection vector to perform a read address compression procedure on a vector of read addresses, wherein the register selection vector comprises element validity indicators corresponding to address elements of the vector of read addresses,
wherein the read address compression procedure comprises:
identifying selected element positions and non-selected element positions based on the element validity indicators; and
shifting in the vector of read addresses a set of active read addresses given by the selected element positions in a predetermined direction towards a predetermined element position, such that the set of active read addresses forms a contiguous group in the vector of read addresses ending on one side at the predetermined element position,
and wherein the register access circuitry is configured to cause a read vector of data values identified by the set of active read addresses to be read out from the registers via a selected read port of the at least one read port.

2. The apparatus of claim 1, wherein the register access circuitry is further configured to apply an inverse read address compression procedure to the read vector of data values, wherein the inverse read address compression procedure shifts elements of the read vector of data values in an inverse manner to the shifting of the set of active read addresses in the vector of read addresses in the read address compression procedure.

3. The apparatus of claim 1, wherein the register access circuitry is further responsive to receipt from the processing circuitry of the register selection vector to perform a register selection vector compression procedure on the register selection vector,
wherein the register selection vector compression procedure comprises:
shifting in the register selection vector those element validity indicators identified as selected element positions in the predetermined direction towards the predetermined element position, such that the element validity indicators identified as selected element positions forms a contiguous group in the register selection vector ending on one side at the predetermined element position.

4. The apparatus of claim 1, wherein the register access circuitry is configured to:
receive in parallel a first register selection vector and a second register selection vector from the processing circuitry;
perform a first read address compression procedure on a first vector of read addresses corresponding to the first register selection vector;
perform a second read address compression procedure on a second vector of read addresses corresponding to the second register selection vector,
wherein at least one of the predetermined direction and the predetermined element position differs between the first read address compression procedure and the second read address compression procedure;
cause a first read vector of data values identified by a first set of active read addresses in the first vector of read addresses to be read out from the registers via a first selected read port of the at least one read port; and
cause a second read vector of data values identified by a second set of active read addresses in the second vector of read addresses to be read out from the registers via a second selected read port of the at least one read port.

5. The apparatus of claim 3, wherein the register access circuitry is configured to:
receive in parallel a first register selection vector and a second register selection vector from the processing circuitry;
perform a first read address compression procedure on a first vector of read addresses corresponding to the first register selection vector;
perform a second read address compression procedure on a second vector of read addresses corresponding to the second register selection vector,
wherein at least one of the predetermined direction and the predetermined element position differs between the first read address compression procedure and the second read address compression procedure;
cause a first read vector of data values identified by a first set of active read addresses in the first vector of read addresses to be read out from the registers via a first selected read port of the at least one read port; and
cause a second read vector of data values identified by a second set of active read addresses in the second vector of read addresses to be read out from the registers via a second selected read port of the at least one read port,
and wherein the register access circuitry is configured to perform a first register selection vector compression procedure on the first register selection vector and to perform a second register selection vector compression procedure on the second register selection vector,
wherein the register access circuitry is configured to compare results of the first register selection vector compression procedure and the second register selection vector compression procedure to determine whether there would be an overlap between the first read vector of data values and the second read vector of data values,
and wherein the register access circuitry is configured to cause the first read vector of data values and the second read vector of data values to be read out in parallel via the first selected read port and the second selected read port when there is not the overlap.

6. The apparatus of claim 3, wherein the register access circuitry is configured to:
receive in parallel a first register selection vector and a second register selection vector from the processing circuitry;
perform a first read address compression procedure on a first vector of read addresses corresponding to the first register selection vector;
perform a second read address compression procedure on a second vector of read addresses corresponding to the second register selection vector,
wherein at least one of the predetermined direction and the predetermined element position differs between the first read address compression procedure and the second read address compression procedure;

cause a first read vector of data values identified by a first set of active read addresses in the first vector of read addresses to be read out from the registers via a first selected read port of the at least one read port; and cause a second read vector of data values identified by a second set of active read addresses in the second vector of read addresses to be read out from the registers via a second selected read port of the at least one read port, and wherein the register access circuitry is configured to perform a first register selection vector compression procedure on the first register selection vector and to perform a second register selection vector compression procedure on the second register selection vector, wherein the register access circuitry is configured to compare results of the first register selection vector compression procedure and the second register selection vector compression procedure to determine whether there would be an overlap between the first read vector of data values and the second read vector of data values, and when there is the overlap, the register access circuitry is configured to select a prioritised read vector of data values of the first read vector of data values and the second read vector of data values to be read out and to signal to the processing circuitry a non-prioritised register selection vector of the first register selection vector and the second register selection vector.

7. The apparatus of claim 6, wherein the register access circuitry further comprises prioritization circuitry configured to select the prioritised read vector of data values in dependence on at least one characteristic of the first register selection vector and the second register selection vector.

8. The apparatus of claim 7, wherein the at least one characteristic comprises a prioritization history of read port selection associated with the first read vector of data values and the second read vector of data values.

9. The apparatus of claim 7, wherein the at least one characteristic comprises a prioritization history of register selection vector selection.

10. The apparatus of claim 7, wherein the processing circuitry comprises an instruction queue to hold instructions of the sequence of instructions pending their issuance for execution and the at least one characteristic comprises an instruction queue age of an instruction associated with one of the first register selection vector and the second register selection vector.

11. The apparatus of claim 7, wherein the at least one characteristic comprises an indicated independence relative to other instructions of an instruction associated with one of the first register selection vector and the second register selection vector.

12. The apparatus of claim 3, wherein the register access circuitry is configured to:

receive in parallel a first register selection vector and a second register selection vector from the processing circuitry;

perform a first read address compression procedure on a first vector of read addresses corresponding to the first register selection vector;

perform a second read address compression procedure on a second vector of read addresses corresponding to the second register selection vector, wherein at least one of the predetermined direction and the predetermined element position differs between the first read address compression procedure and the second read address compression procedure;

cause a first read vector of data values identified by a first set of active read addresses in the first vector of read addresses to be read out from the registers via a first selected read port of the at least one read port; and cause a second read vector of data values identified by a second set of active read addresses in the second vector of read addresses to be read out from the registers via a second selected read port of the at least one read port, and wherein the register access circuitry is configured to perform a first register selection vector compression procedure on the first register selection vector and to perform a second register selection vector compression procedure on the second register selection vector, wherein the register access circuitry is configured to compare results of the first register selection vector compression procedure and the second register selection vector compression procedure to determine whether there would be an overlap between the first read vector of data values and the second read vector of data values, and when there is the overlap, the register access circuitry is configured to apply a reconfiguration to at least one of the predetermined direction and the predetermined element position for at least one of the first read address compression procedure and the second read address compression procedure.

13. The apparatus of claim 12, wherein the reconfiguration comprises allocating more element positions to a non-prioritised register selection vector of the first register selection vector and the second register selection vector relative to a prioritised register selection vector of the first register selection vector and the second register selection vector.

14. A system comprising:

the apparatus of claim 1, implemented in at least one packaged chip;

at least one system component; and a board, wherein the at least one packaged chip and the at least one system component are assembled on the board.

15. A chip-containing product comprising the system of claim 14 assembled on a further board with at least one other product component.

16. A method comprising:

performing data processing operations in response to a sequence of instructions;

holding data values in registers that are subject to the data processing operations and comprising at least one read port via which data values are read from the registers;

in response to receipt of a register selection vector, performing a read address compression procedure on a vector of read addresses, wherein the register selection vector comprises element validity indicators corresponding to address elements of the vector of read addresses, wherein the read address compression procedure comprises:

identifying selected element positions and non-selected element positions based on the element validity indicators; and shifting in the vector of read addresses a set of active read addresses given by the selected element positions in a predetermined direction towards a predetermined element position, such that the set of active read addresses forms a contiguous group in the vector of read addresses ending on one side at the predetermined element position; and causing a read vector of data values identified by the set of active read addresses to be read out from the registers via a selected read port of the at least one read port.

17. A non-transitory computer-readable medium to store computer-readable code for fabrication of an apparatus comprising:

processing circuitry to perform data processing operations in response to a sequence of instructions; and register bank circuitry to provide registers for holding data values that are subject to the data processing operations and comprising at least one read port via which data values are read from the registers, wherein the register bank circuitry further comprises register access circuitry responsive to receipt from the processing circuitry of a register selection vector to perform a read address compression procedure on a vector of read addresses, wherein the register selection vector comprises element validity indicators corresponding to address elements of the vector of read addresses, wherein the read address compression procedure comprises:

identifying selected element positions and non-selected element positions based on the element validity indicators; and shifting in the vector of read addresses a set of active read addresses given by the selected element positions in a predetermined direction towards a predetermined element position, such that the set of active read addresses forms a contiguous group in the vector of read addresses ending on one side at the predetermined element position, and wherein the register access circuitry is configured to cause a read vector of data values identified by the set of active read addresses to be read out from the registers via a selected read port of the at least one read port.

* * * * *